United States Patent [19]

Hammes

[11] Patent Number: 4,886,673

[45] Date of Patent: Dec. 12, 1989

[54] METHOD OF PRESERVING MEAT PRODUCTS AND MICROORGANISMS FOR THE STABILIZATION OF MEAT PRODUCTS

[75] Inventor: Walter P. Hammes, Filderstadt-Bernhausen, Fed. Rep. of Germany

[73] Assignee: Karl Muller u. Co. KG, Stuttgart, Fed. Rep. of Germany

[21] Appl. No.: 275,920

[22] Filed: Nov. 25, 1988

[30] Foreign Application Priority Data

Nov. 25, 1987 [DE] Fed. Rep. of Germany ....... 3739989

[51] Int. Cl.$^4$ ......................... A23L 1/31; C12R 1/225; C12R 1/265; C12R 1/645
[52] U.S. Cl. ........................................ 426/56; 426/59; 426/332; 426/266; 435/853; 435/859; 435/911
[58] Field of Search ..................... 426/56, 61, 59, 332, 426/266; 435/853, 859, 911, 822

[56] References Cited

U.S. PATENT DOCUMENTS

| | | | |
|---|---|---|---|
| 3,981,773 | 9/1976 | Galzy et al. | 426/48 |
| 4,147,807 | 4/1979 | Gryczka et al. | 426/56 |
| 4,304,868 | 12/1981 | Gryczka et al. | 426/56 |
| 4,591,499 | 5/1986 | Linn et al. | 426/2 |
| 4,728,518 | 3/1988 | Gonzalez et al. | 426/56 |

Primary Examiner—Marianne Cintins
Attorney, Agent, or Firm—Burns, Doane, Swecker & Mathis

[57] ABSTRACT

Microorganisms suitable for the stabilization of meat products. The present invention is intended to provide novel microorganisms, which lead within a short period of time to a particularly pure and agreeable aroma, a satisfactory pickled color and a stable product. The microorganisms Lactobacillus curvatus DSM 4265, Micrococcus varians DSM 4263, and Debaryomyces hanseneii DSM 4260 lead to the desired results.

8 Claims, No Drawings

METHOD OF PRESERVING MEAT PRODUCTS AND MICROORGANISMS FOR THE STABILIZATION OF MEAT PRODUCTS

BACKGROUND

For the fermentation of raw pickle meat products (acidulation) so-called lactic acid formers have been used for a considerable period of time. These conventional acid formers frequently originate in foreign biotopes and are generally selected on the basis of inexpensive production possibilities and the formation of pure lactic acid.

It is further known to use micrococci in the fermentation of raw pickle meat products. As a rule, this use leads after an adequate curing time to a typical desirable aromatization of the food product. However, the reductase and catalase activities of these strains—in particular the "*Micrococcus varians*" strains—are not optimal.

Yeasts and in particular the yeast species "*Debaryomyces hansenii*" are already being used as starter cultures to improve the flavor (cured flavor). The aromatization desired is generally detectable after a fermentation period of 4 to 8 days. But these known yeasts are capable of interfering with the enzyme activity of other cultures, which are also used.

It is the object of the present invention to provide additional microorganisms capable of developing an aroma as pure as possible without variations in taste of the meat products and the pickle goods respectively, whereby an increased degree of safety is obtained in fermentation and reddening, color retention and the aromatizing effect are attained stronger and within a shorter period of time.

SUMMARY OF THE INVENTION

The present invention concerns microorganisms suitable for the stabilization of meat products. The microorganisms are *Lactobacillus curvatus* DSM 4265, *Micrococcus varians* DSM 4263, and *Debaryomyces hanseneii* DSM 4260.

DETAILED DESCRIPTION OF THE PREFERRED EMBODIMENTS OF THE INVENTION

It has now been discovered surprisingly that the above object may be attained by the microorganism strains of *Lactobacillus curvatus* (L-A-C)=DSM 4265, *Micrococcus varians* (M-I-C)=DSM 4263, and *Debaryomyces hanseneii* (H-E-B)=DSM 4260, which were deposited on Oct. 8, 1987, in the German collection of microorganisms (DSM) and are handled there in accordance with the specifications of the Budapest treaty.

These three strains are outstandingly suitable for the production of raw pickle meat products (for example cut and spreadable raw sausages), but also generally for meat and food products which are fermented or remain raw for a limited period of time. Typical meat products for use in the present invention include beef, pork, and poultry. Preferred types of pork include pork belly and back bacon.

For reasons of hygiene, i.e., to avoid pathogenic and toxicogenic microorganisms, to produce a stable pickle color and pickle flavor, niter (mostly in the form of $KNO_3$) and nitrite (in the form of a mixture of table salt and $NaNO_2$) are added to the meat products. In the pickling process—at the onset of curing—the niter is reduced in part biologically to nitrite. The nitrite released finally serves to develop a stable, red pickled color.

Reductase has a visible advantage even when nitrite is used. In the process part of the nitrite added is oxidized to nitrate. The niter formed in this manner must again be reduced.

The strain *Micrococcus varians* (M-I-C) reduces the nitrate very rapidly and adequately, so that a good pickle color and color retention is assured. Furthermore, the residual quantities of the nitrate and nitrite are reduced in the finished meat product in a hygienically advantageous manner. These enzyme activities are assured also at pH values around 5.0 and temperatures from 8° C. on up. The usual addition of niter can be reduced by using this strain.

Raw meat, together with other food and raw food products having a high water content, contain for biological reasons (as the result of the growth of the spontaneous flora) peroxide ($H_2O_2$). Peroxide interferes particularly in raw pickle products with the formation of pickle color and with color retention. But discoloration due to peroxide may be observed in other food products also. Peroxide is highly capable of decomposing fats and rendering them rancid.

The catalase enzyme produced by *Micrococcus varians* (M-I-C) decomposes the peroxide, thereby protecting the food products against the aforedescribed oxidation phenomena.

Compared to other micrococci, the DSM 4263 strain has an optimum catalase activity (even at temperatures from 8° C. and pH values around 5.0). This micrococcus strain leads by virtue of its lipase activity to the aromatization desired.

A fermentation aroma desired may also be obtained by means of the strain *Debaryomyces hanseneii* DSM 4260 (H-E-B) in an especially strong and rapid manner (within 24 to 48 hours). It was discovered in the process that this yeast improves reddening in a fashion similar to ascorbic acid and advantageously stabilizes the color of the food product.

The *Lactobacillus curvatus* DSM 4265 (L-A-C) strain leads to the controlled formation of lactic acid with the appropriate sugars without an appreciable simultaneous growth of the competing acid formers and without the occurrence of a "foreign" flavor deviation in the food products.

The above-described microorganism strains were investigated in keeping with the following criteria and were found to be suitable in all respects for the intended application:

1. no pathogeneity characteristics;
2. rapid, pure aroma formation;
3. (in the case of *Lactobacillus curvatus*) formation of pure lactic acid; strongly competitive, i.e., spontaneous flora are not substantially increased in the raw pickle products during the fermentation process;
4. (in the case of *Debaryomyces hansenii*) possible combinations with lactic acid forming or nitrate reducing cultures;
5. (in the case of *Micrococcus varians*) reductase activity assuring the lowest residual quantities of nitrate and nitrite in the food products; adequate catalase activity to protect the food product against oxidation phenomena; the activity of the strain is protected within a very broad temperature range and at pH values around 5.0.

The invention will become more apparent from the following examples of application, it being understood that these examples are intended only to be illustrative without serving as a limitation on the scope of the present invention.

EXAMPLE 1

*Lactobacillus curvatus* DSM 4265 in the production of cut raw sausage (salami type).

Material composition 30 kg beef, ligaments coarsely removed, visible fat proportion 5%
30 kg pork, free of ligaments, visible fat proportion 5%
20 kg pork belly, visible fat proportion 60%
20 kg back bacon, without rind
= 100 kg material

Additions per 1 kg of material 28 g nitrite pickling salt (=99.5% common salt+0.5% nitrite)
5 g glucose
2 g pepper, white, ground
$5 \times 10^9$ *Lactobacillus curvatus* DSM 4265 Freeze Dried

Material preparation

1. Materials are cut into pieces.
2. The beef, the pork belly and the bacon are frozen hard.
3. The pork is cooled well and ground through the 8 mm disk immediately prior to processing.

Production

1. The freeze-dried starter culture "*Lactobacillus curvatus* DSM 4265" is stirred for uniform distribution into a slight volume of tap water (about 200 g).
2. The beef is comminuted in the cutter with the addition of the starter culture until the mass is slightly bonding.
3. Glucose and pepper are added and
4. the mass allowed to run a few more rounds in the cutter to obtain good intermixing.
5. The bacon and the pork belly are added and
6. Cutting is continued until the bacon attains a grain size of 6–8 mm.
7. The preground pork is cut in together with the nitrite pickling salt.
8. The cutting of the entire mass is continued until the fat has a grain size of about 2 mm and the sausage mass exhibits bonding.
9. The finished sausage mass (temperature approximately minus 2° C.) is filled in water permeable fiber skins, diameter 70 mm.

Aging in an air-conditioned cabinet:

1. Initially the external water precipitation is dried off for 6 h at 70% relative atmospheric humidity and 24° C.
2. Further conditioning for 18 h at 90–92% relative atmospheric humidity and 24° C.
3. Conditioning on the second day.
   (a) For 12 h at 90% relative atmospheric humidity and 22° C.
   (b) For another 12 h at 88% relative atmospheric humidity and 20° C. Some smoke is added and the air circulation increased hourly.
4. Conditioning from the third to the seventh day: The temperature and relative atmospheric humidity are gradually reduced to after-aging conditions.
5. After-aging conditions and drying: 14°–16° C., 76–78% relative atmospheric humidity.

Results

In keeping with the claim of a "dominant" starter culture, 10 days after the onset of the aging process, the following microbiological investigation was recorded:

|  | Number of germs/gram |
|---|---|
| Total | $9 \times 10^8$ |
| *Lactobacillus curvatus* DSM 4265 | $9 \times 10^8$ |
| Acid formers | $8 \times 10^6$ |
| Coliform germs | less than $10^2$ |
| Aerobic spore formers | less than $10^2$ |
| Enterobacteria | less than $10^2$ |
| Proteolytes | less than $10^2$ |

Note

With the conventional lactic acid forming starter cultures the microorganisms added also increase during the acidulation of the sausage in the first 2–4 days of aging to numbers between $10^8$ and $10^9$. However, the spontaneous acid forming flora also increase in keeping with the initial number of germs. After acidulation, the starters die off as they are not adapted to meat. The spontaneous acid forming flora, on the other hand, live on while the water activity of the medium allows it, and consequently may lead to loss of quality relative to the color, taste and consistency of the finished product.

EXAMPLE 2

*Micrococcus varians* DSM 4263 in the production of salami (cut raw sausage).

Material composition 30 kg beef, ligaments coarsely removed, visible fat proportion 5%
30 kg pork, ligaments removed, visible fat proportion 5%
20 kg pork belly, visible fat proportion 60%
20 kg back bacon, without rind
= 100 kg

Additions per 1 kg material 28.0 g table salt
0.3 g potassium nitrate
4.0 g glucose
2.0 g pepper, white, ground
$5 \times 10^9$ *Pedioccus acidilactici*, freeze dried (lactic acid forming starter culture of commercial quality)
$5 \times 10^9$ *Micrococcus varians* DSM 4263, freeze dried.

Material preparation

1. The materials are cut into pieces.
2. The beef, pork belly and bacon are frozen hard.
3. The pork is cooled well and immediately prior to processing is passed through the 8 mm disk.

Production

1. The freeze-dried starter cultures *Pedicoccus acidilacti* and *Mircrococcus varians* are stirred for uniform distribution into a slight volume of tap water (about 200 g).

2. The beef is comminuted in the cutter with the addition of the starter culture until the mass is slightly bonding.
3. The potassium nitrate, glucose and pepper are added and
4. The mass allowed to run a few more rounds in the cutter to obtain good intermixing.
5. The bacon and the pork belly are added and
6. Cutting is continued until the bacon attains a grain size of 6–8 mm.
7. The preground pork is cut in together with the table salt.
8. The cutting of the entire mass is continued until the fat has a grain size of about 2 mm and the sausage mass exhibits bonding.
9. The finished sausage mass (temperature approximately minus 2° C.) is filled in water permeable fiber skins, diameter 70 mm.

Aging in an air-conditioned cabinet

1. Initially, the external precipitation water is dried off the sausages at a 70% relative atmospheric humidity and at an approximate temperature of 18° C. for 6 h.
2. The relative atmospheric humidity is then increased to 94% for another 18 h.
3. After a total period of 24 h, the temperature is increased at a constant humidity to 22° C. These climatic conditions are maintained at a slight air circulation for another 24 h.
4. On the third day, some smoke is added and the temperature is adjusted to 20° C. and the relative atmospheric humidity to 90–92%.
5. On the fourth day: relative atmospheric humidity 88–90%, temperature 18° C.
6. On the fifth day: relative atmospheric humidity 86–88%, temperature 18° C. Sausages finished smoked.
7. On the sixth day: relative atmospheric humidity 84–86%, temperature 18° C.
8. On the seventh day: relative atmospheric humidity 82–84%, temperature 16° C.
9. Beginning on the eight day: drying under after-aging conditions: temperature 14°–16° C., relative atmospheric humidity approximately 78%.

Results

1. Due to the found catalase activity of the strain "*Micrococcus varians* DSM 4263" the salami shows after aging for 5–7 days already a "permanent pickle color" even when cut, in addition to excellent reddening.
2. The reductase (decomposition of niter), which is outstanding for Micrococci, shows the following analysis 7 days after the onset of aging -: (with an initial value of 300 mg potassium nitrate per 1 kg of the sausage mass)
= 36 mg nitrite and 76 mg nitrate per 1 kg of the sausage mass
Calculated as the total nitrate:
= 129 mg per 1 kg of the sausage mass.

EXAMPLE 3

*Debaryomyces hansenii* DSM 4260 in the production of coarse, spreadable "Mettwurst" (German sausage) (fresh raw sausage)

Material composition 70 kg pork cuts without ligaments or rinds, with a proportion of visible fat of approximately 30%
30 kg pork bellies, without rind, with a visible proportion of fat of 60%.
= 100 kg material

Additions per 1 kg material 26 g nitrite pickling salt
2.5 k glucose
1 g pepper, white, ground
$5 \times 10^9$ *Pediococcus pentosaceous*, freeze dried (lactic acid forming starter culture of commercial quality)
$2 \times 10^9$ *Debaryomyces hansenii* DSM 4260, concentrated and frozen.

Material preparation

The entire material is cut into pieces and cooled.

Production

1. The freeze-dried starter culture *Pediococcus pentosaceous* is stirred together with the frozen yeast *Debaryomyces hansenii* DSM 4260, into a slight volume of tap water (about 200 g) for better distribution.
2. All additives are mixed well with the coarse pieces of the meat material.
3. The entire mass is then passed through the 3 mm disk (simple blade set).
4. Immediately thereafter, the sausage mass is filled into water permeable collagen sausage skins, diameter 43 mm.

Conditioning

The sausages are allowed to redden and age for 24–36 h at 24° C., at a relative atmospheric humidity of approximately 80% and slight air circulation. Cold smoking is carried out prior to the completion of the conditioning process. The final pH value of the finished sausage is between pH 5.4 and 5.2.

Results

1. The fermentation (acidulation) of the sausage mass takes place satisfactorily within 24–36 h.
2. The reddening of the sausages with yeast added is comparatively more rapid.
3. The coloration of the coarse spreading sausage prepared with yeast is stable.
4. Within 24–36 h immediately following the reduction of the pH value, a pronounced aged aroma is recognizable in the case of the sausage with yeast. The comparison sausages on the other hand taste "flat".

Although the invention has been described in terms of various preferred embodiments, one skilled in the art will appreciate that various modifications, substitutions, omissions, and changes may be made without departing from the spirit thereof. Accordingly, it is intended that the scope of the present invention be limited solely by the scope of the following claims.

What is claimed is:
1. A microorganism for the stabilization of meat products selected from the group consisting of isolated:
*Lactobacillus curvatus* DSM 4265,
*Micrococcus varians* DSM 4263, and
*Debaryomyces hanseneii* DSM 4260.

2. A method of preserving meat products comprising adding to the meat products a microorganism selected from the group consisting of:

Lactobacillus curvatus DSM 4265,

Micrococcus varians DSM 4263, and

Debaryomyces hanseneii DSM 4260 said microorganism being added in an amount effective to stabilize said meat products.

3. The method of claim 2 wherein the method of preserving is pickling.

4. The method of claim 2 wherein the microorganism is used in combination with niter, nitrite, or a combination thereof.

5. The method of claim 2 wherein the meat product is beef.

6. The method of claim 2 wherein the meat product is pork.

7. The method of claim 2 wherin the meat product is poultry.

8. THe method of claim 2 wherein the meat product is pork belly or back bacon.

* * * * *